(12) United States Patent
Ko et al.

(10) Patent No.: US 8,520,598 B2
(45) Date of Patent: Aug. 27, 2013

(54) DATA TRANSMISSION APPARATUS USING MULTIPLE ANTENNAS AND METHOD THEREOF

(75) Inventors: Hyun Soo Ko, Gyeongki-do (KR); Seung Hee Han, Gyeongki-do (KR); Jae Hoon Chung, Gyeongki-do (KR); Bin Chul Ihm, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 13/000,546

(22) PCT Filed: Jun. 5, 2009

(86) PCT No.: PCT/KR2009/003026
§ 371 (c)(1),
(2), (4) Date: Dec. 21, 2010

(87) PCT Pub. No.: WO2009/157659
PCT Pub. Date: Dec. 30, 2009

(65) Prior Publication Data
US 2011/0110307 A1 May 12, 2011

Related U.S. Application Data

(60) Provisional application No. 61/075,754, filed on Jun. 26, 2008, provisional application No. 61/081,377, filed on Jul. 16, 2008, provisional application No. 61/087,975, filed on Aug. 11, 2008, provisional application No. 61/088,353, filed on Aug. 13, 2008, provisional application No. 61/097,537, filed on Sep. 16, 2008.

(30) Foreign Application Priority Data

May 15, 2009 (KR) ............... 10-2009-0042729

(51) Int. Cl.
*H04W 4/00* (2009.01)
*H04L 27/00* (2006.01)
(52) U.S. Cl.
USPC .......................... 370/328; 375/299

(58) Field of Classification Search
USPC .................................. 370/328–330
See application file for complete search history.

(56) References Cited

U.S. PATENT DOCUMENTS

| 6,888,809 B1 | 5/2005 | Foschini et al. |
| 7,881,247 B2 | 2/2011 | Pan et al. |

(Continued)

FOREIGN PATENT DOCUMENTS

| KR | 10-2001-0076252 | 8/2001 |
| KR | 2005-0069802 | 7/2005 |

(Continued)

OTHER PUBLICATIONS

C. Ciochina et al., "Single-Carrier Space-Frequency Block Coding Performance Evaluation", IEEE 66th Vehicular Technology Conference, 2007, pp. 715-719.

(Continued)

*Primary Examiner* — Afshawn Towfighi
(74) *Attorney, Agent, or Firm* — Morgan, Lewis & Bockius LLP

(57) ABSTRACT

An apparatus for transmitting data includes a data processing unit for generating a data symbol by channel-coding and constellation-mapping on information bits, a Discrete Fourier Transform (DFT) unit for generating a frequency domain symbol by performing DFT on the data symbols, a Multiple-Input Multiple-Output (MIMO) processing unit for generating a first transmission symbol by applying a first transmission diversity scheme to the frequency domain symbol and generating a second transmission symbol by applying a second transmission diversity scheme to the first transmission symbol, a Single Carrier-Frequency Division Multiple Access (SC-FDMA) modulation unit for generating an SC-FDMA symbol by performing Inverse Fast Fourier Transform (IFFT) on the first transmission symbol and the second transmission symbol, and a plurality of transmission antennas for sending the SC-FDMA symbol.

12 Claims, 8 Drawing Sheets

(56) References Cited

U.S. PATENT DOCUMENTS

| | | |
|---|---|---|
| 8,068,555 B2 | 11/2011 | Jongren et al. |
| 8,095,143 B2 | 1/2012 | Amirijoo et al. |
| 2003/0139139 A1 | 7/2003 | Onggosanuisi et al. |
| 2004/0077378 A1 | 4/2004 | Kim et al. |
| 2005/0265280 A1 | 12/2005 | Roh et al. |
| 2006/0067421 A1 | 3/2006 | Walton et al. |
| 2007/0004465 A1 | 1/2007 | Papasakellariou et al. |
| 2007/0115795 A1 | 5/2007 | Gore et al. |
| 2007/0189151 A1* | 8/2007 | Pan et al. .................. 370/210 |
| 2007/0211822 A1 | 9/2007 | Olesen et al. |
| 2008/0032746 A1 | 2/2008 | Olesen et al. |
| 2008/0056117 A1 | 3/2008 | Muharemovic et al. |
| 2008/0080472 A1 | 4/2008 | Bertrand et al. |
| 2008/0080637 A1* | 4/2008 | Khan et al. .................. 375/267 |
| 2008/0089441 A1 | 4/2008 | Hwang et al. |
| 2008/0095252 A1 | 4/2008 | Kim et al. |
| 2008/0117999 A1 | 5/2008 | Kadous et al. |
| 2008/0165891 A1 | 7/2008 | Budianu et al. |
| 2008/0279170 A1 | 11/2008 | Malladi et al. |
| 2008/0307427 A1 | 12/2008 | Pi et al. |
| 2009/0073922 A1* | 3/2009 | Malladi et al. ............. 370/328 |
| 2009/0202016 A1 | 8/2009 | Seong et al. |
| 2009/0279447 A1 | 11/2009 | Mehta et al. |
| 2010/0091903 A1 | 4/2010 | Castelain et al. |
| 2010/0091919 A1 | 4/2010 | Xu et al. |
| 2010/0111209 A1 | 5/2010 | Frenger |
| 2011/0228728 A1* | 9/2011 | Baligh et al. ............... 370/328 |

FOREIGN PATENT DOCUMENTS

| | | |
|---|---|---|
| KR | 2006-0048106 | 5/2006 |
| KR | 10-0698199 B | 3/2007 |
| KR | 10-0785806 B | 12/2007 |
| KR | 2008-0025260 | 3/2008 |
| KR | 10-0899735 B | 5/2009 |
| WO | 03/085876 | 10/2003 |
| WO | 2008-054322 A2 | 5/2008 |

OTHER PUBLICATIONS

International Search Report from PCT/KR2009/003487.
International Search Report from PCT/KR2009/003466.
International Search Report from PCT/KR2009/003026.
International Search Report from PCT/KR2009/003012.
International Search Report from PCT/KR2009/003027.
International Search Report from related technology PCT Application No. PCT/KR2009/003037.
Office Action issued in technologically related U.S. Appl. No. 13/001,219 dated Oct. 25, 2012.
Office Action issued in technologically related U.S. Appl. No. 13/000,958 dated Oct. 18, 2012.
Notice of Allowance issued in technologically related U.S. Appl. No. 13/058,488 dated Nov. 15, 2012.
Office Action issued in technologically related U.S. Appl. No. 13/000,470 dated Nov. 29, 2012.
U.S. Appl. No. 61/074,399, filed Jun. 20, 2008.
USPTO—Office Action for U.S. Appl. No. 13/001,219—Issued on Feb. 15, 2013.
USPTO—Office Action for U.S. Appl. No. 13/000,706—Issued on Mar. 20, 2013.

* cited by examiner

DATA TRANSMISSION APPARATUS USING MULTIPLE ANTENNAS AND METHOD THEREOF

The present application is a national stage of PCT International Application No. PCT/KR2009/003026, filed Jun. 5, 2009, which claims the benefit of U.S. Provisional Application Nos. 61/075,754, filed Jun. 26, 2008; 61/081,377, filed Jul. 16, 2008; 61/087,975, filed Aug. 11, 2008; 61/088,353, filed Aug. 13, 2008; and 61/097,537, filed Sep. 16, 2008, and claims the benefit of Korean Application No. 10-2009-0042729, filed May 15, 2009.

BACKGROUND OF THE INVENTION

1. Field of the Invention

The present invention relates to wireless communication, and more particularly, to an apparatus and method for transmitting data using multiple antennas.

2. Discussion of the Related Art

Recently, a demand for wireless data service is abruptly increasing. Evolution from wireless voice service towards wireless data service requires a gradual increase of the wireless capacity. Such requirement enables wireless service providers and wireless equipment manufacturers to try to improve the data transmission rate of wireless systems and gives them a motive to do active research.

A wireless channel experiences several problems, such as path loss, shadowing, fading, noise, a limited bandwidth, a limit power of a terminal, and interference between users. Such a limit makes the wireless channel have a form similar to a narrow pipe which hinders the fast flow of data and also makes it difficult to design an efficient bandwidth of wireless communication which provides high-speed data transmission. Other challenges in the design of a wireless system include resource allocation, mobility issues related to a rapidly changing physical channel, portability, and the design of providing security and privacy.

If an additional version or replica of a transmitted signal is not received when a transmission channel experiences deep fading, it makes it difficult for a receiver to determine the transmitted signal. Resources corresponding to the additional version or replica are called diversity. The diversity is one of the most important factors which contribute to reliable transmission over wireless channels. If the diversity is employed, the capacity or reliability of data transmission can be maximized. A system implementing diversity using multiple transmission antennas and multiple reception antennas is referred to as Multiple Input Multiple Output (MIMO), and the MIMO system is also called a multiple-antenna system.

In the MIMO system, schemes for implementing diversity include Space Frequency Block Code (SFBC), Space Time Block Code (STBC), Cyclic Delay Diversity (CDD), Frequency Switched Transmit Diversity (FSTD), Time Switched Transmit Diversity (TSTD), Precoding Vector Switching (PVS), Spatial Multiplexing (SM), Generalized Cyclic Delay Diversity (GCDD), and Selective Virtual Antenna Permutation (S-VAP) and the like.

Meanwhile, one of systems taken into consideration in systems after the third generation is an Orthogonal Frequency Division Multiplexing (OFDM) system capable of attenuating the inter-symbol interference effect through low complexity. In the OFDM system, serial input data is converted into an N number of parallel data, carried on an N number of orthogonal subcarriers, and then transmitted. The subcarriers maintain orthogonality in the frequency domain. Orthogonal Frequency Division Multiple Access (OFDMA) refers to a multiple-access method of realizing multiple-access by independently providing some of available subcarriers to each user in a system using the OFDM method as a modulation method.

However, one of the major problems of the OFDM/OFDMA systems is that the Peak-to-Average Power Ratio (PAPR) may be very high. The PAPR problem is that the peak amplitude of a transmission signal is very greater than the average amplitude. The PAPR problem is caused by the fact that an OFDM symbol is the overlapping of an N number of sinusoidal signals on different subcarriers. The PAPR is related to the capacity of the battery and problematic in a terminal which is sensitive to power consumption. In order to reduce power consumption, the PAPR needs to be lowered.

One of systems proposed to lower the PAPR is a Single Carrier-Frequency Division Multiple Access (SC-FDMA) system. SC-FDMA is of a form in which a Frequency Division Multiple Access (FDMA) method is grafted onto a Single Carrier-Frequency Division Equalization (SC-FDE) method. The SC-FDMA method has a similar characteristic to the OFDMA method in that data is modulated and demodulated in the time domain and the frequency domain, but is advantageous in terms of low transmission power because Discrete Fourier Transform (DFT) is used and so the PAPR of a transmission signal is low. In particular, it can be said that the SC-FDMA method is advantageous in uplink communication in which a terminal sensitive to the transmission power in relation to the use of the battery performs communication to a base station. An important point when a terminal sends data to a base station is that the bandwidth of transmitted data is not great, but coverage in which power can be concentrated must be wide. An SC-FDMA system has a wider coverage than other systems when the same power amplifier is used because a variation in the signal is small.

In using the SC-FDMA method, however, attention must be paid to the satisfaction of a single carrier property. A wireless communication system must be able to provide transmission diversity to lower the PAPR by employing the SC-FDMA method. STBC (that is, one of the above transmission diversity schemes) is a scheme for obtaining a diversity gain by using selectivity in the space domain and the time domain. There is a need for an apparatus and method for transmitting data, in which the STBC scheme is used, but transmission diversity to lower the PAPR can be provided.

SUMMARY OF THE INVENTION

Accordingly, the present invention has been made in view of the above problems, and it is an object of the present invention to provide an apparatus and method for transmitting data using multiple antennas.

According to an embodiment of the present invention, an apparatus for transmitting data is provided. The apparatus includes a data processing unit for generating a data symbol by channel-coding and constellation-mapping on information bits, a Discrete Fourier Transform (DFT) unit for generating a frequency domain symbol by performing DFT on the data symbols, a Multiple-Input Multiple-Output (MIMO) processing unit for generating a first transmission symbol by applying a first transmission diversity scheme to the frequency domain symbol and generating a second transmission symbol by applying a second transmission diversity scheme to the first transmission symbol, a Single Carrier-Frequency Division Multiple Access (SC-FDMA) modulation unit for generating an SC-FDMA symbol by performing Inverse Fast Fourier Transform (IFFT) on the first transmission symbol and the second transmission symbol, and a plurality of transmission antennas for sending the SC-FDMA symbol. The MIMO processing unit divides the plurality of transmission antennas into a first group and a second group, and maps the first transmission symbol to the first group and the second transmission symbol to the second group.

According to another embodiment of the present invention A method of transmitting data is provided. The method includes generating a data symbol by channel-coding and constellation-mapping on information bits, generating a frequency domain symbol by performing DFT on the data symbol, generating a first transmission symbol by applying a first transmission diversity scheme to the frequency domain symbol and generating a second transmission symbol by applying a second transmission diversity scheme to the first transmission symbol, dividing a plurality of transmission antennas into a first group and a second group, and mapping the first transmission symbol to the first group and the second transmission symbol to the second group, generating SC-FDMA symbols by mapping the first and the second transmission symbols to subcarriers and by performing IFFT on the first and second transmission symbols, and sending the SC-FDMA symbols using the plurality of transmission antennas.

In a data transmission system including a plurality of transmission antennas, an SC-FDMA system can be easily implemented because a single carrier property can be maintained and STBC and other transmission diversity schemes can also be used.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
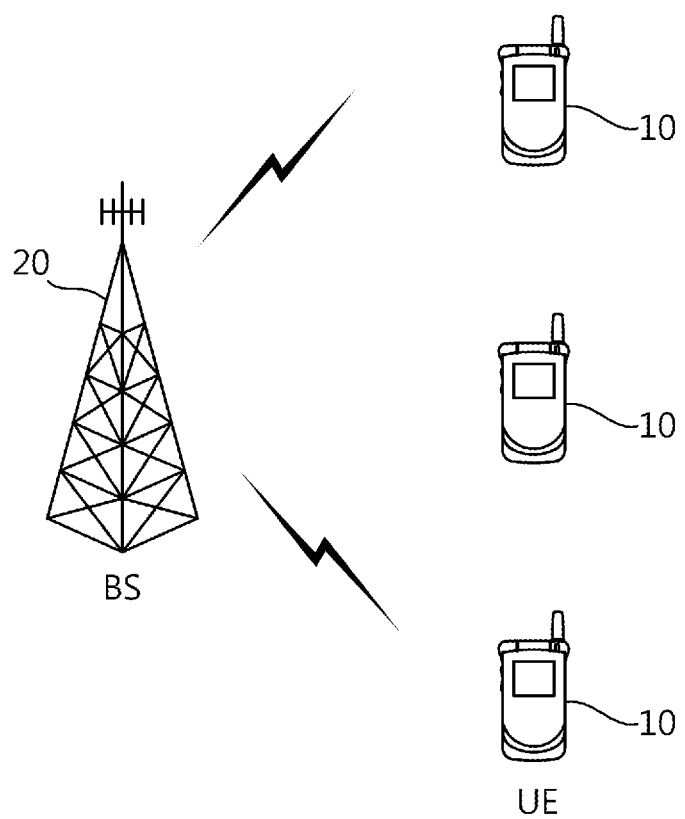
FIG. 1 is a diagram showing a wireless communication system.

FIG. 1 is a diagram showing a wireless communication system. The wireless communication systems are widely deployed in order to provide various communication services, such as voice and packet data.

Referring to FIG. 1, the wireless communication system includes User Equipments (UEs) 10 and a Base Station (BS) 20. The UE 10 may be fixed or mobile and may also be called another terminology, such as a Mobile Station (MS), a User Terminal (UT), a Subscriber Station (SS), or a wireless device. The BS 20 refers to a fixed station communicating with the UEs 10, and it may also be called another terminology, such as a node-B, a Base Transceiver System (BTS), or an access point. One or more cells may exist in one base station 20.

Multi-access schemes applied to the wireless communication system are not limited. The wireless communication system may be based on multiple-access methods, such as Code Division Multiple Access (CDMA), Time Division Multiple Access (TDMA), Frequency Division Multiple Access (FDMA), Single Carrier FDMA (SC-FDMA), Orthogonal Frequency Division Multiple Access (OFDMA), or other known modulation techniques. The above modulation schemes increase the capacity of a communication system by demodulating signals received from multiple users of the communication system.

The wireless communication system may be a multiple-antenna system. The multiple-antenna system may be a Multiple-Input Multiple-Output (MIMO) system. Alternatively, the multiple-antenna system may be Multiple-Input Single-Output (MISO) system, a Single-Input Single-Output (SISO) system, or a Single-Input Multiple-Output (SIMO) system. The MIMO system uses a plurality of transmission antennas and a plurality of reception antennas. The MISO system uses a plurality of transmission antennas and a single reception antenna. The SISO system uses one transmission antenna and one reception antenna. The SIMO system uses one transmission antenna and a plurality of reception antennas.

A Space Time Block Code (STBC) scheme, a Space Frequency Block Code (SFBC) scheme, a Frequency Switched Transmit Diversity (FSTD) scheme, a Cyclic Delay Diversity (CDD) scheme, a Time Switched Transmit Diversity (TSTD) scheme, a spatial multiplexing scheme, or a Precoding Vector Switching (PVS) scheme may be used as a multiple antenna transmission/reception scheme for operating the multiple-antenna system.

The STBC scheme is used to separate signals in the time and space domains, send the signals, and determine the signals received through respective antennas using a maximum likelihood combining scheme. The FSTD scheme is used to obtain a diversity gain by allocating the subcarriers of different frequencies to a transmitted signal transmitted through multiple antennas. The CDD scheme is used to obtain a diversity gain by using path delay between transmission antennas. The PVS scheme is kind of a transmission diversity scheme and used to obtain a random beamforming gain by switching a precoding vector (that is, weight) per certain time, slot, or symbol.

Subcarriers may be allocated according to the following methods; (1) a distributed allocation method of allocating the subcarriers having equal distances in the bandwidth of the entire system, (2) a localized allocation method of allocating locally contiguous subcarriers in the bandwidth of the entire system, and (3) a method of allocating subcarriers at equal distances or certain intervals in a locally contiguous subcarrier set. An SC-FDMA system uses the method (1) or (2) when mapping DFT-distributed symbol strings to subcarriers. This is for the purpose of maintaining the single subcarrier property.

Hereinafter, downlink (DL) refers to communication from the BS 20 to the UE 10, and uplink (UL) refers to communication from the UE 10 to the BS 20. In downlink, a transmitter may be part of the BS 20 and a receiver may be part of the UE 10. In uplink, a transmitter may be part of the UE 10 and a receiver may be part of the BS 20.

A multiple-access method for downlink transmission may be different from a multiple-access method for uplink transmission. For example, an Orthogonal Frequency Division Multiple Access (OFDMA) method may be used as the multiple-access method for downlink transmission. A Single Carrier-Frequency Division Multiple Access (SC-FDMA) method or a clustered DFT-S-OFDM method may be used as the multiple-access method for uplink transmission. In a common SC-FDMA method, DFT-S symbol strings are allocated (or mapped) to contiguous subcarriers or subcarriers having equal distances. In the clustered DFT-S-OFDM method, M(<N) symbol strings from among DFT-S N symbol strings are allocated (or mapped) to contiguous subcarriers and the remaining N-M symbol strings are allocated (or mapped) to contiguous subcarriers spaced apart from one another, from among subcarriers to which the M symbol strings have been allocated (or mapped). The clustered DFT-S-OFDM method is advantageous in that frequency selective scheduling can be performed.

Figure 2:
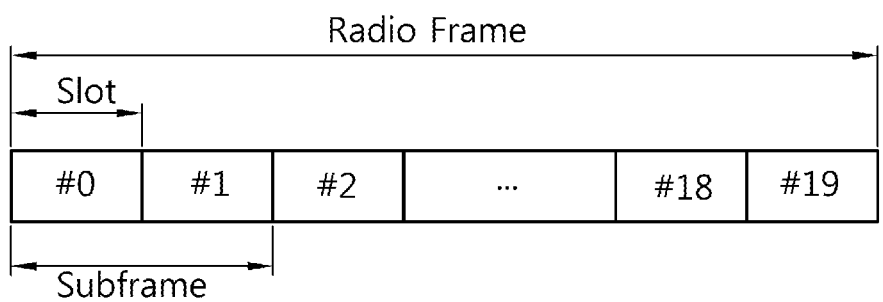
FIG. 2 shows an example of a radio frame structure.

FIG. 2 shows an example of a radio frame structure.

Referring to FIG. 2, the radio frame consists of 10 subframes. Each of the subframes may include 2 slots. One subframe is a 1 Transmission Time Interval (TTI), and the 1 TTI is 1 ms. Each of the slots is 0.5 ms in length. The slot may include a plurality of SC-FDMA symbols (OFDM symbols) in the time domain and at least one subcarrier in the frequency domain. The slot may be said to be a unit for allocating radio resources in the time domain and the frequency domain. Frequency hopping may be generated every slot within a subframe. The term 'frequency hopping' refers to a case in which 2 contiguous slots belong to different frequency bands.

The number of SC-FDMA symbols included in one slot may vary according to the configuration of a Cyclic Prefix (CP). The CP includes an extended CP and a normal CP. For example, in case where the SC-FDMA symbols are composed on the basis of the normal CP, the number of SC-FDMA symbols included in one slot may be seven. In case where the SC-FDMA symbols are composed on the basis of the extended CP, the number of SC-FDMA symbols included in one slot is small as compared with the normal CP because the length of the SC-FDMA symbol is increased. For example, the number of SC-FDMA symbols included in one slot may be six. The extended CP may be used to further reduce inter-symbol interference in case where a channel condition is unstable as in the case where a UE moves at a fast speed or may be used to provide Multimedia Broadcast Multicast Service (MBMS).

The structure of the radio frame is only illustrative, and the number of subframes included in the radio frame, number of slots included in the subframe, and the number of SC-FDMA symbols included in the slot may be changed in various ways.

Figure 3:
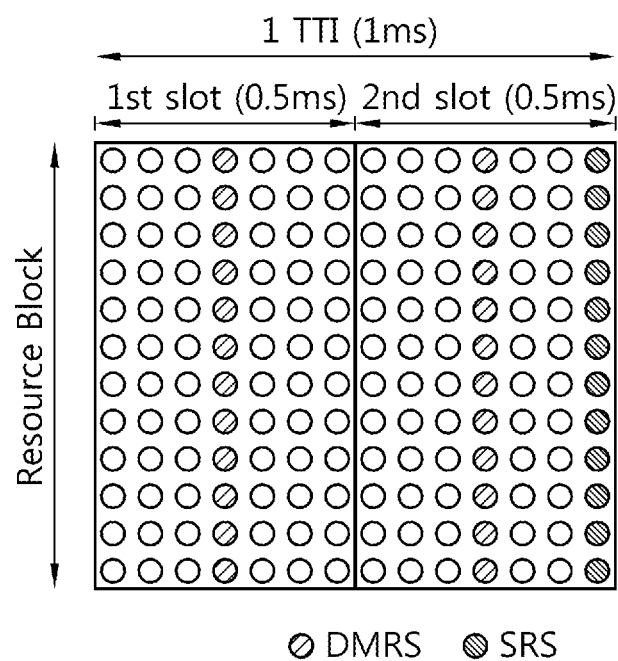
FIG. 3 shows an example of a subframe.

FIG. 3 shows an example of a subframe.

Referring to FIG. 3, the subframe includes two slots. Each of the slots includes 7 SC-FDMA symbols in the time domain. Meanwhile, a plurality of resource blocks (RB) is included in the frequency domain. A unit composed of one SC-FDMA symbol and one subcarrier is called a resource element. Assuming that one resource block includes 12 subcarriers, one resource block includes; resource elements.

Data or an uplink reference signal may be carried on each SC-FDMA symbol. There are two kinds of uplink reference signals. One of the uplink reference signals is used to estimate a channel in order to demodulate uplink data, and the other of the uplink reference signals is used to schedule the frequency domain of uplink by checking a channel condition of uplink. The former reference signal is called a data demodulation reference signal (hereinafter referred to as a 'DMRS'), and the latter reference signal is called a scheduling reference signal or a sounding reference signal (hereinafter referred to as an 'SRS'). The DMRS is transmitted in a limited frequency domain only when there is data transmitted in uplink, whereas the SRS is periodically transmitted through the entire frequency band of uplink irrespective of whether data exists or not.

In each slot, one SC-FDMA symbol is allocated in order to send the DMRS. The SRS may be carried on the last SC-FDMA symbol of a second slot of each subframe. Assuming that the remaining SC-FDMA symbols are allocated to send data, 6 SC-FDMA symbols are allocated to a first slot in order to send data, and 5 SC-FDMA symbols are allocated to a second slot in order to send data. In order for the STBC scheme to be used, SC-FDMA symbols have to be even-numbered in pairs. In the case of the first slot, the SC-FDMA symbols can be paired because the number of SC-FDMA symbols on which data is carried is 6. Meanwhile, in the case of the second slot, 4 SC-FDMA symbols can be paired every two symbols because the number of SC-FDMA symbols on which data is carried is 5, but the remaining one SC-FDMA symbol cannot be paired. In order to send data in one SC-FDMA symbol not paired as described above, another transmission diversity scheme, not requiring that SC-FDMA symbols be paired, may be used. For example, schemes, such as CDD, PVS, and FSTD, may be used.

The structure of the subframe is only illustrative. Furthermore, the number of slots included in each subframe, the number of SC-FDMA symbols included in each slot, and the location of a SC-FDMA symbol in which the DMRS is transmitted may be changed in various ways.

In the STBC scheme, different transmission symbols are transmitted over one OFDM or SC-FDMA symbol through two transmission antennas. Accordingly, there is a need for an apparatus and method for transmitting transmission symbols through two transmission antennas in one resource region (frequency or time domain) when transmission is performed using four transmission antennas according to the STBC scheme.

Figure 4:
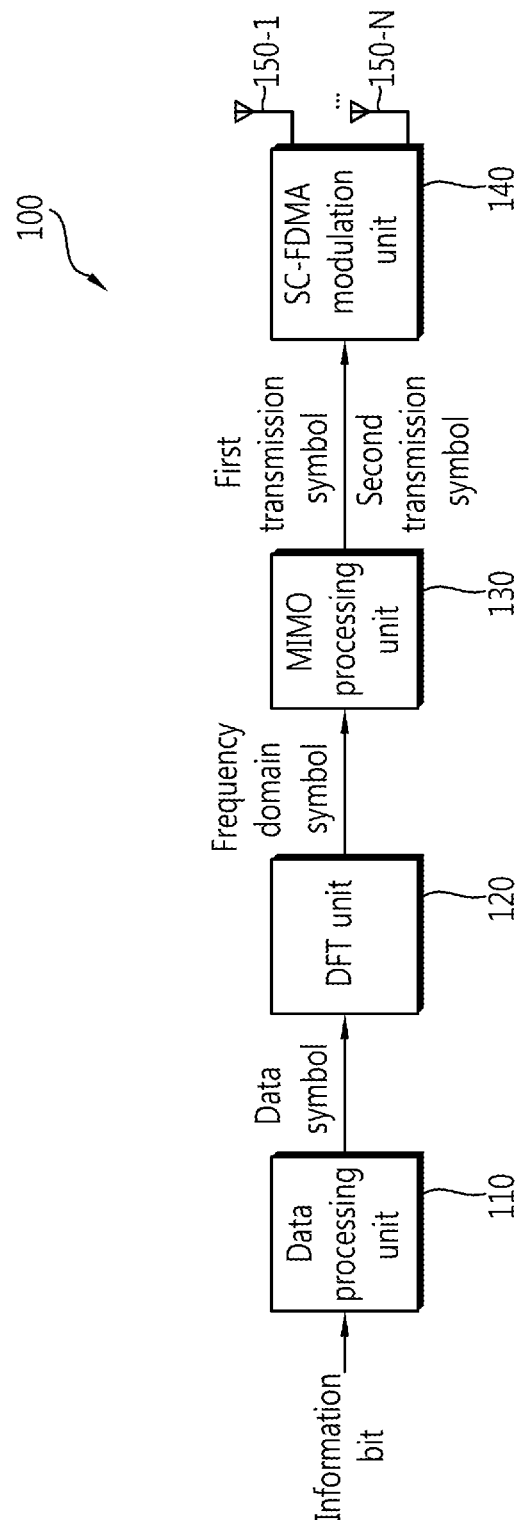
FIG. 4 is a block diagram of a data transmission apparatus in a multi-antenna system according to an example of the present invention.

FIG. 4 is a block diagram of a data transmission apparatus in a multi-antenna system according to an example of the present invention.

Referring to FIG. 4, the data transmission apparatus 100 includes a data processing unit 110, a DFT unit 120, a MIMO processing unit 130, an SC-FDMA modulation unit 140, and a plurality of transmission antennas 150-1 to 150-N.

The data processing unit 110 generates data symbols by performing channel coding on received information bits and performing constellation mapping on the channel coded bits. The information bits include user information to be sent to a data reception apparatus. The information bits may further include control information which is related to the transmission of information about a user plane or the allocation of radio resources.

The DFT unit 120 outputs frequency domain symbols by performing DFT on the received data symbols. The data symbols inputted to the DFT unit 120 may be control information or user data or both. The size of DFT is M which may be fixed to the size of an allocated resource block or may be variable according to the system. In case where the data transmission apparatus 100 implements transmission diversity according to the FSTD scheme, the DFT unit 120 may be one or two parallel structures. In case where the DFT unit 120 has a single structure, the data symbol of M/2 in length is twice inputted to the DFT unit 120. Meanwhile, in case where the DFT unit 120 has two parallel structures, the data transmission apparatus 100 may include the two DFT units 120 each having a DFT size of M/2.

The MIMO processing unit 130 generates first transmission symbols by applying a first transmission diversity scheme to the frequency domain symbols and generates second transmission symbols by applying a second transmission diversity scheme to the first transmission symbols. The first and second transmission diversity schemes are different transmission diversity schemes. The first transmission diversity scheme may be the STBC scheme. The second transmission diversity scheme may be any one of the FSTD, CDD, and PVS schemes.

Figure 5:
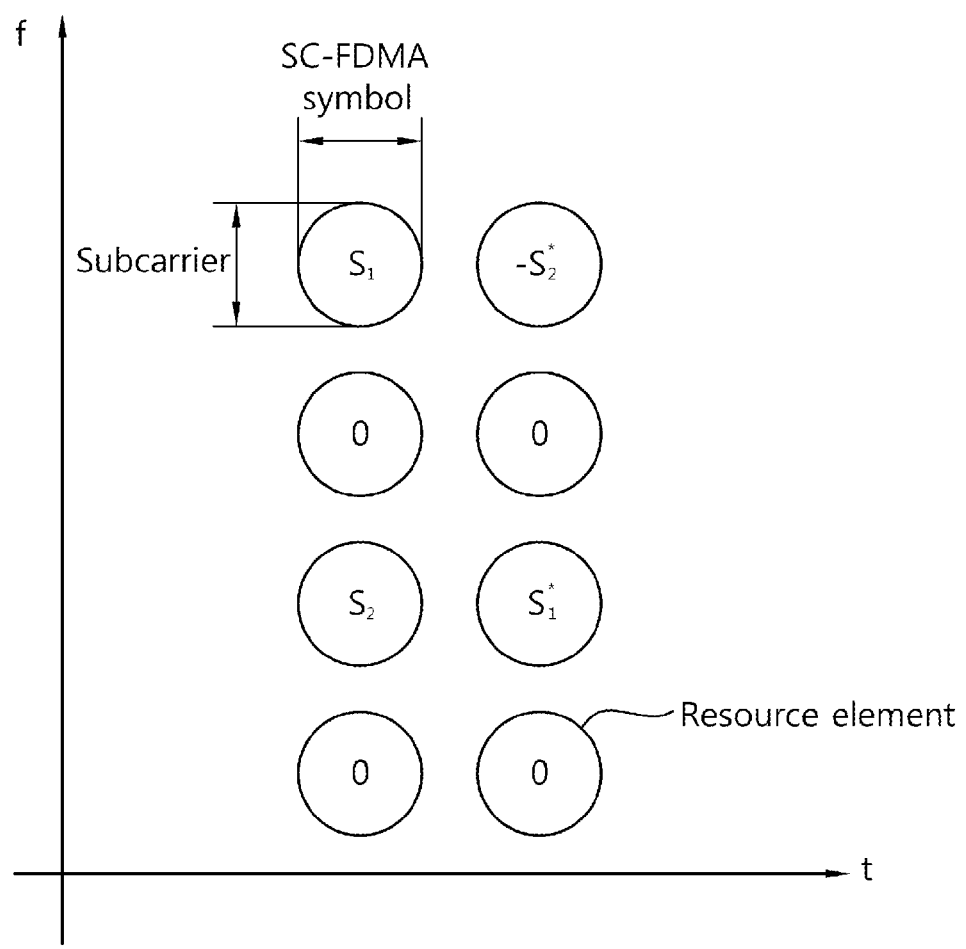
FIG. 5 shows an example of transmission symbols generated by the MIMO processing unit according to the present invention.

FIG. 5 shows an example of the transmission symbols generated by the MIMO processing unit according to the present invention. This corresponds to a case in which the first transmission diversity scheme is the STBC scheme and the second transmission diversity scheme is the FSTD scheme. Furthermore, it is assumed that the number of transmission antennas is 4.

Referring to FIG. 5, it is assumed that the frequency domain symbols inputted to the MIMO processing unit 130 are $S_1$ and $S_2$. If the STBC scheme is applied to the frequency domain symbols, the first transmission symbols $S_1$, $S_2$, $S^*_1$, and $-S^*_2$ which will be mapped to two SC-FDMA symbols are generated. Meanwhile, if the FSTD scheme (that is, a localized allocation method) is applied to the first transmission symbols again, $S_1$, 0, $S_2$, 0, $S^*_1$, 0, $-S^*_2$, and 0 are generated. Accordingly, the transmission symbols finally generated by the MIMO processing unit 130 in the frequency and time domains are shown in FIG. 5. The final transmission symbols are of a form in which one resource region (indicated by a resource element) is used by two of the four transmission antennas and the other resource region is used by the remaining two transmission antennas so that the resource regions do not overlap with each other according to the FSTD scheme. That is, $S_1$, 0, $S_2$, and 0 are sequentially mapped to four subcarriers on the first SC-FDMA symbol, and $-S^*_2$, 0, $S^*_1$, and 0 are sequentially mapped to four subcarriers on the second SC-FDMA symbol.

Figure 6:
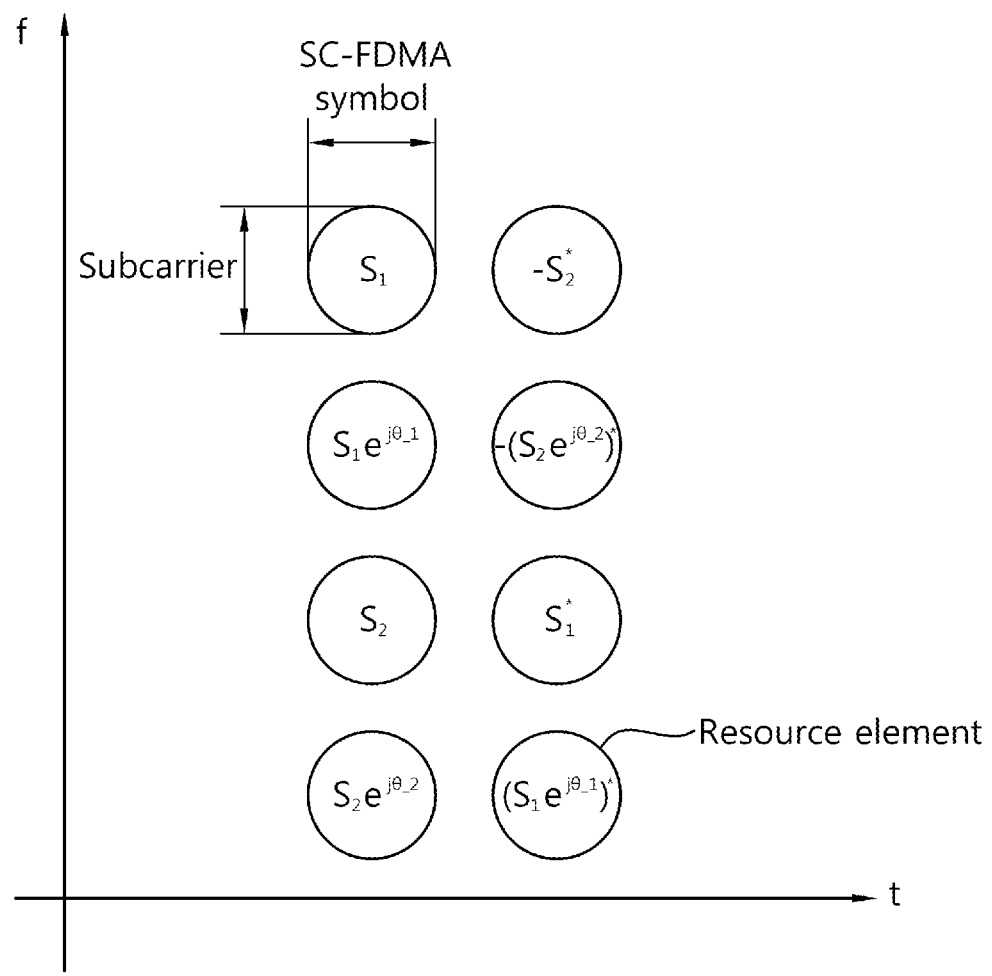
FIG. 6 shows another example of transmission symbols generated by the MIMO processing unit according to the present invention.

FIG. 6 shows another example of the transmission symbols generated by the MIMO processing unit according to the present invention. This corresponds to a case in which the first transmission diversity scheme is the STBC scheme and the second transmission diversity scheme is the CDD scheme. Furthermore, it is assumed that the number of transmission antennas is 4.

Referring to FIG. 6, it is assumed that the frequency domain symbols inputted to the MIMO processing unit 130 are $S_1$ and $S_2$. If the STBC scheme is applied to the frequency domain symbols, the first transmission symbols $S_1$, $S_2$, $S^*_1$, and $-S^*_2$ which will be mapped to two SC-FDMA symbols are generated. Meanwhile, if the CDD scheme is applied to the first transmission symbols again, the second transmission symbols $S_1 e^{j\theta-1}$, $S_2 e^{j\theta-2}$, $(S_1 e^{j\theta-1})^*$, and $-(S_2 e^{j\theta-2})^*$ are generated because each of the transmission symbols is delayed by a certain phase.

Accordingly, the transmission symbols finally generated by the MIMO processing unit 130 in the frequency and time domains are shown in FIG. 6. A mapping relationship between the transmission symbols and the transmission antennas is listed in the following table.

TABLE 1

| | First SC-FDMA symbol | Second SC-FDMA symbol |
|---|---|---|
| First transmission antenna | $S_1$ | $-S^*_2$ |
| Second transmission antenna | $S_1 e^{j\theta-1}$ | $-(S_2 e^{j\theta-2})^*$ |
| Third transmission antenna | $S_2$ | $S^*_1$ |
| Fourth transmission antenna | $S_2 e^{j\theta-2}$ | $(S_1 e^{j\theta-1})^*$ |

Here, the first transmission symbols $S_1$, $S_2$, $S^*_1$, and $-S^*_2$ are transmitted over the first and second SC-FDMA symbols through the first and third transmission antennas. This corresponds to one STBC scheme transmission. Furthermore, the first and third transmission antennas form one virtual antenna.

Furthermore, the second transmission symbols $S_1 e^{j\theta-1}$, $S_2 e^{j\theta-2}$, $(S_1 e^{j\theta-1})^*$, and $-(S_2 e^{j\theta-2})^*$ are transmitted over the first and second SC-FDMA symbols through the second and fourth transmission antennas. This corresponds to the other STBC scheme transmission. Furthermore, the second and fourth transmission antennas form the other virtual antenna. According to the above method, two transmission diversity schemes may be applied to a system using four transmission antennas. In particular, the single carrier property may be maintained in an SC-FDMA system.

A delay value according to the CDD scheme may be determined by the following equation.

$$[1 e^{-j\theta_{2k}} \ldots e^{-j\theta_{Mk}}]^T \quad \text{[Equation 1]}$$

In Equation 1, a phase component $\theta$ is expressed by Equation 2.

$$\theta = \frac{2\pi \times a}{M} \quad \text{[Equation 2]}$$

In Equation 2, $\alpha$ is a delay component and M is a certain integer. In case where $\alpha$ is an integer, a=M/N and N may be the number of transmission antennas. In case where $\alpha$ is a decimal, there is an advantage in that a beamforming gain can be obtained by using a small delay value (that is, a<1).

Figure 7:
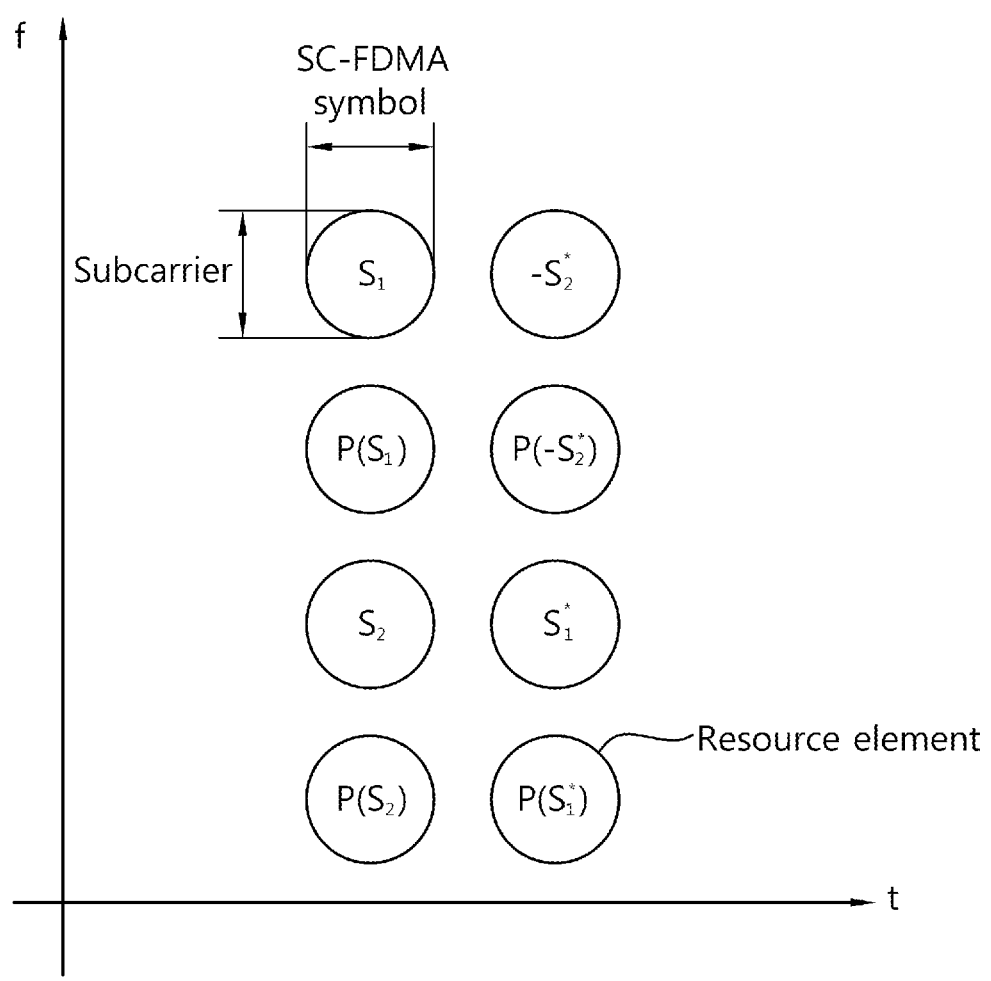
FIG. 7 shows yet another example of transmission symbols generated by the MIMO processing unit according to the present invention.

FIG. 7 shows yet another example of the transmission symbols generated by the MIMO processing unit according to the present invention. This corresponds to a case in which the first transmission diversity scheme is the STBC scheme and the second transmission diversity scheme is the PVS scheme. Furthermore, it is assumed that the number of transmission antennas is 4.

Referring to FIG. 7, it is assumed that the frequency domain symbols inputted to the MIMO processing unit 130 are $S_1$ and $S_2$. If the STBC scheme is applied to the frequency domain symbols, the first transmission symbols $S_1$, $S_2$, $S^*_1$, and $-S^*_2$ which will be mapped to two SC-FDMA symbols are generated. Meanwhile, if the PVS scheme is applied to the frequency domain symbols, a different precoding vector may be applied to each of the transmission symbols. Accordingly, it is assumed that such a varying function is P(a). Here, 'a' indicates the inputted transmission symbols. If the PVS scheme is applied to the first transmission symbols, the second transmission symbols $P(S_1)$, $P(S_2)$, $P(S^*_1)$, and $P(-S^*_2)$ are generated. Accordingly, the transmission symbols finally generated by the MIMO processing unit 130 in the frequency and time domains are shown in FIG. 7. A mapping relationship between the transmission symbols and the respective transmission antennas is listed in the following table.

TABLE 2

| | First SC-FDMA symbol | second SC-FDMA symbol |
|---|---|---|
| First transmission antenna | $S_1$ | $-S^*_2$ |
| Second transmission antenna | $P(S_1)$ | $P(-S^*_2)$ |
| Third transmission antenna | $S_2$ | $S^*_1$ |
| Fourth transmission antenna | $P(S_2)$ | $P(S^*_1)$ |

Here, the first transmission symbols $S_1$, $S_2$, $S^*_1$, and $-S^*_2$ are transmitted over the first and second SC-FDMA symbols through the first and third transmission antennas. This corresponds to one STBC scheme transmission. Furthermore, the first and third transmission antennas form one virtual antenna.

Furthermore, the second transmission symbols $P(S_1)$, $P(S_2)$, $P(S^*_1)$, and $P(-S^*_2)$ are transmitted over the first and second SC-FDMA symbols through the second and fourth transmission antennas. This corresponds to the other STBC scheme transmission. Furthermore, the second and fourth transmission antennas form the other virtual antenna. According to the above method, two transmission diversity schemes may be applied to a system using four transmission antennas. In particular, the single carrier property may be maintained in an SC-FDMA system.

A subset from rank 1 precoding weight defined as codebooks, such as that listed in the following table, may be used as a precoding vector used in the PVS scheme.

TABLE 3

| Codebook index | Weight vector |
|---|---|
| 0 | $\frac{1}{\sqrt{2}}\begin{bmatrix}1\\1\end{bmatrix}$ |
| 1 | $\frac{1}{\sqrt{2}}\begin{bmatrix}1\\-1\end{bmatrix}$ |
| 2 | $\frac{1}{\sqrt{2}}\begin{bmatrix}1\\j\end{bmatrix}$ |
| 3 | $\frac{1}{\sqrt{2}}\begin{bmatrix}1\\-j\end{bmatrix}$ |

Referring back to FIG. 4, in order for the first and second transmission diversity schemes to be applied at the same time, it is preferred that the plurality of transmission antennas 150-1 to 150-N is an even number. For example, the number of transmission antennas may be 4. In this case, two of the four transmission antennas are used to send the first transmission symbols according to the first transmission diversity scheme, and the remaining two transmission antennas are used to send the second transmission symbols according to the second transmission diversity scheme.

Meanwhile, the MIMO processing unit 130 divides the plurality of transmission antennas 150-1 to 150-N into two groups and maps the first transmission symbols to the first group and the second transmission symbols to the second group. In case where the FSTD scheme is applied, the first group and the second group may have different frequency bands. For example, if the first group uses subcarriers of a first frequency band, the second group may use subcarriers of a second frequency band. Accordingly, the first and second frequency bands do not overlap with each other.

The transmission antennas belonging to the first and second groups may have several index combinations. For example, assuming that there are four transmission antennas designated by indices 1 to 4, the indices of the transmission antennas belonging to the first and second groups may have three combinations as in the following table. {a,b} refers to a group of $a^{th}$ and $b^{th}$ transmission antennas.

TABLE 4

| | Index of transmission antenna of first group | Index of transmission antenna of second group |
|---|---|---|
| Combination 1 | {1, 2} | {3, 4} |
| Combination 2 | {1, 3} | {2, 4} |
| Combination 3 | {1, 4} | {2, 3} |

Each group generally corresponds to one virtual antenna. Accordingly, in case where a system includes two groups, it is equivalent to a case where two virtual antennas are included.

In order to maintain the single carrier property, the same transmission antenna group is applied within at least one SC-FDMA (or OFDM) symbol. For STBC scheme transmission, the same transmission antenna group is applied to at least two SC-FDMA (or OFDM) symbols. A method of determining a group of transmission antennas is described below.

For example, the group of the transmission antennas may be determined to have a similar transit performance. For example, in case where a common pilot is used to distinguish the transmission antennas, a different pilot density may be used in each of the transmission antennas, and so the transmission antenna group may have a different transit performance. In this case, the transmission antenna groups may have a similar transit performance by properly determining the transmission antenna group. In case where the density of the first and second transmission antennas is high and the pilot density of the third and fourth transmission antennas is low, the two groups may have a similar transit performance by configuring the first group including the first and third transmission antennas and the second group including the second and fourth transmission antennas.

For another example, a spatial multiplexing gain may be increased by applying a different transmission antenna group per two SC-FDMA (or OFDM) symbols or slots. For example, assuming that a first slot includes 6 OFDM symbols for data transmission, 3 symbol pairs can be obtained by pairing the 6 OFDM symbols for every two OFDM symbols. A different transmission antenna group may be applied to each of the symbol pairs. This is listed in the following table.

TABLE 5

| | First symbol pair | Second symbol pair | Third symbol pair |
|---|---|---|---|
| Transmission antenna group | {1, 2}/{3, 4} | {1, 3}/{2, 4} | {1, 4}/{2, 3} |

Alternatively, the transmission antenna groups may be divided per slot. For example, the transmission antenna groups {1,2}/{3,4} may be used in a first slot, and the transmission antenna group {1,3}/{2,4} may be used in a second slot.

The SC-FDMA modulation unit 140 maps the first transmission symbols and the second transmission symbols to respective subcarriers according to various signal structure methods. Here, in case where the second transmission diversity scheme is the FSTD scheme, the subcarriers are separated and applied to the respective transmission antennas 150-1 to 150-N. A method of allocating the subcarriers to the respective transmission antennas may include a distributed allocation method or a localized allocation method.

The SC-FDMA modulation unit 140 generates SC-FDMA symbols (that is, a time domain signal) by performing Inverse Fast Fourier Transform (IFFT) on the first and second transmission symbols mapped to the subcarriers.

Although SC-FDMA modulation has been described as an example, OFDM modulation may be performed in case where FFT is performed one data symbols, and symbols generated at this time may be OFDM symbols. The plurality of transmission antennas 150-1 to 150-N transmits the SC-FDMA symbols.

Figure 8:
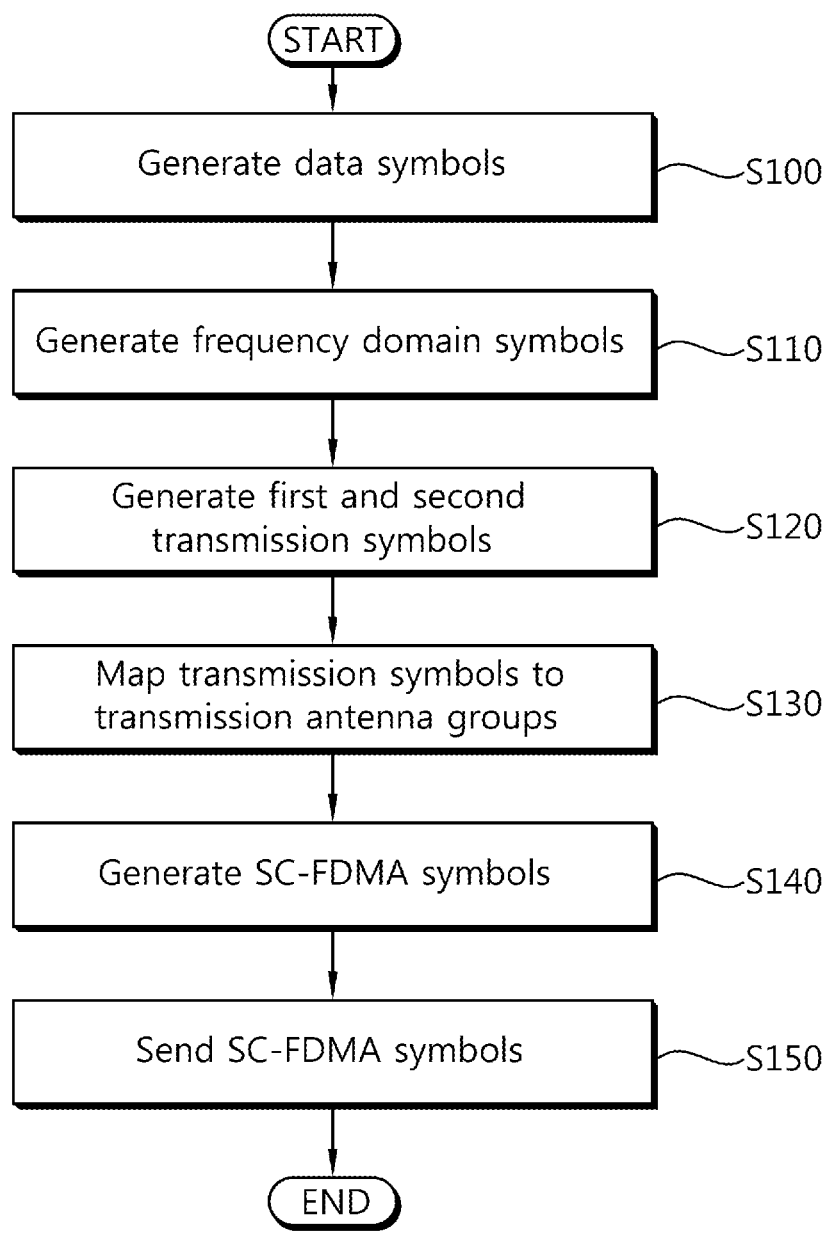
FIG. 8 is a flowchart illustrating a method of transmitting data in a multi-antenna system according to the present invention.

FIG. 8 is a flowchart illustrating a method of transmitting data in a multi-antenna system according to the present invention.

Referring to FIG. 8, data symbols are generated by performing channel coding and constellation-mapping on information bits at step S100. Frequency domain symbols are generated by performing DFT on the data symbols at step S110. First transmission symbols are generated by applying a first transmission diversity scheme to the frequency domain symbols, and second transmission symbols are generated by applying a second transmission diversity scheme to the first transmission symbols at step S120. The first transmission diversity scheme may be the STBC scheme, and the second transmission diversity scheme may be any one of the FSTD, CDD, and PVS schemes.

The plurality of transmission antennas is divided into two groups. The first transmission symbols are mapped to the first group, and the second transmission symbols are mapped to the second group at step S130. The mapping process is also called transmission antenna pairing. After the first transmission symbols and the second transmission symbols are mapped to subcarriers, SC-FDMA symbols are performed by performing IFFT on the first and second transmission symbols at step S140. The first group uses subcarriers of a first frequency band and the second group uses subcarriers of a second frequency band. Accordingly, the first and second frequency bands do not overlap with each other. The SC-FDMA symbols are transmitted through the plurality of transmission antennas at step S150.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for transmitting data, the apparatus comprising:
 a data processing unit configured to generate a data symbol by channel-coding and constellation-mapping on information bits;
 a Discrete Fourier Transform (DFT) unit configured to generate a frequency domain symbol by performing DFT on the data symbols;
 a Multiple-Input Multiple-Output (MIMO) processing unit configured to:
 generate a first transmission symbol by applying a first transmission diversity scheme to the frequency domain symbol; and
 generate a second transmission symbol by applying a second transmission diversity scheme to the first transmission symbol, the first transmission diversity scheme applied to the frequency domain symbol being different from the second transmission diversity scheme applied to the first transmission symbol;
 a Single Carrier-Frequency Division Multiple Access (SC-FDMA) modulation unit configured to generate an SC-FDMA symbol by performing Inverse Fast Fourier Transform (IFFT) on the first transmission symbol and the second transmission symbol; and
 a plurality of transmission antennas configured to send the SC-FDMA symbol,
 wherein the MIMO processing unit is further configured to:
 divide the plurality of transmission antennas into a first group and a second group, and
 map the first transmission symbol to the first group and the second transmission symbol to the second group.

2. The apparatus of claim 1, wherein:
 the first transmission diversity scheme comprises a Space Time Block Code (STBC) scheme; and
 the second transmission diversity scheme comprises a Pre-coding Vector Switching (PVC) scheme.

3. The apparatus of claim 1, wherein:
 the first transmission diversity scheme comprises a Space Time Block Code (STBC) scheme; and
 the second transmission diversity scheme comprises a Cyclic Delay Diversity (CDD) scheme.

4. The apparatus of claim 1, wherein:
 the first transmission diversity scheme comprises a Space Time Block Code (STBC) scheme, and
 the second transmission diversity scheme comprises a Frequency Switched Transmit Diversity (FSTD) scheme.

5. The apparatus of claim 4, wherein:
 the first group is configured to use subcarriers in a first frequency band,
 the second group is configured to use subcarriers in a second frequency band, and
 the first and second frequency bands do not overlap with each other.

6. The apparatus of claim 1, wherein each of the first group and the second group comprises two transmission antennas.

7. A method of transmitting data, the method comprising:
 generating a data symbol by channel-coding and constellation-mapping on information bits;
 generating a frequency domain symbol by performing Discrete Fourier Transform (DFT) on the data symbol;
 generating a first transmission symbol by applying a first transmission diversity scheme to the frequency domain symbol;
 generating a second transmission symbol by applying a second transmission diversity scheme to the first transmission symbol, the first transmission diversity scheme applied to the frequency domain symbol being different from the second transmission diversity scheme applied to the first transmission symbol;
 dividing a plurality of transmission antennas into a first group and a second group;
 mapping the first transmission symbol to the first group and the second transmission symbol to the second group;
 generating Single Carrier-Frequency Division Multiple Access (SC-FDMA) symbols by mapping the first and the second transmission symbols to subcarriers and by performing Inverse Fast Fourier Transform (IFFT) on the first and second transmission symbols; and
 sending the SC-FDMA symbols using the plurality of transmission antennas.

8. The method of claim 7, wherein:
 the first transmission diversity scheme comprises a Space Time Block Code (STBC) scheme; and the second transmission diversity scheme comprises a Precoding Vector Switching (PVC) scheme.

9. The method of claim 7, wherein:
the first transmission diversity scheme comprises a Space Time Block Code (STBC) scheme; and
the second transmission diversity scheme comprises a Cyclic Delay Diversity (CDD) scheme.

10. The method of claim 7, wherein:
the first transmission diversity scheme comprises a Space Time Block Code (STBC) scheme; and
the second transmission diversity scheme comprises a Frequency Switched Transmit Diversity (FSTD) scheme.

11. The method of claim 10, wherein:
the first group uses the subcarriers in a first frequency band;
the second group uses the subcarriers in a second frequency band; and
the first and second frequency bands do not overlap with each other.

12. The method of claim 7, wherein each of the first group and the second group comprises two transmission antennas.

* * * * *